(12) United States Patent
Ahmed et al.

(10) Patent No.: US 8,191,051 B2
(45) Date of Patent: May 29, 2012

(54) SYSTEM AND METHOD FOR DEVELOPING AND PROCESSING BUILDING SYSTEM CONTROL SOLUTIONS

(75) Inventors: Osman Ahmed, Hawthorn Woods, IL (US); Pornsak Songkakul, Mequon, MI (US)

(73) Assignee: Siemens Industry, Inc., Alpharetta, GA (US)

( * ) Notice: Subject to any disclaimer, the term of this patent is extended or adjusted under 35 U.S.C. 154(b) by 1397 days.

(21) Appl. No.: 11/474,862

(22) Filed: Jun. 26, 2006

(65) Prior Publication Data

US 2007/0006124 A1 Jan. 4, 2007

Related U.S. Application Data

(62) Division of application No. 10/668,949, filed on Sep. 23, 2003.

(51) Int. Cl.
*G06F 9/45* (2006.01)
*G06F 9/44* (2006.01)
*G05B 15/02* (2006.01)
(52) U.S. Cl. ......... 717/137; 717/114; 717/126; 700/276
(58) Field of Classification Search .................. 717/137
See application file for complete search history.

(56) References Cited

U.S. PATENT DOCUMENTS

| | | | |
|---|---|---|---|
| 6,968,544 B1* | 11/2005 | Schneider | 717/146 |
| 7,134,072 B1* | 11/2006 | Lovett et al. | 715/234 |
| 7,761,506 B2* | 7/2010 | Petropoulakis et al. | 709/204 |
| 2001/0034754 A1* | 10/2001 | Elwahab et al. | 709/201 |
| 2002/0066072 A1* | 5/2002 | Crevatin | 717/104 |
| 2003/0014611 A1* | 1/2003 | Ferris | 712/35 |
| 2003/0144979 A1* | 7/2003 | Storms et al. | 707/1 |
| 2003/0149613 A1* | 8/2003 | Cohen et al. | 705/11 |
| 2003/0154216 A1* | 8/2003 | Arnold et al. | 707/104.1 |

OTHER PUBLICATIONS

Auslander et al., Control Software for Mechanical Systems: Object-Oriented Design in a Real-Time World, Jun. 17, 2002, Prentice Hall, Excerpt from Chapter 4.*

* cited by examiner

*Primary Examiner* — James D Rutten

(57) ABSTRACT

A system automatically generates building system application solutions. The system includes a system design verifier and a system design converter. The system design verifier is configured to verify an application definition. The system design converter is coupled to the system design verifier, and is configured to convert verified application definitions into computer statements that are executable on a processor to implement a building system application solution that corresponds to the application definition.

20 Claims, 9 Drawing Sheets

SYSTEM AND METHOD FOR DEVELOPING AND PROCESSING BUILDING SYSTEM CONTROL SOLUTIONS

This is a divisional of U.S. patent application Ser. No. 10/668,049, filed Sep. 23, 2003, which in turn claims the benefit of U.S. Provisional Patent Application Ser. No. 60/441,838, filed Jan. 22, 2003, which is incorporated herein by reference.

CROSS REFERENCE TO RELATED APPLICATIONS

This application is related to U.S. patent application Ser. Nos. 10/629,226 filed Jul. 28, 2003; Ser. No. 10/628,977 filed Jul. 28, 2003; Ser. No. 10/629,976 filed Jul. 28, 2003; Ser. No. 10/629,229 filed Jul. 28, 2003 and 10/628,978 filed Jul. 28, 2003.

FIELD OF THE INVENTION

This invention relates to control systems for building systems such as environmental systems and, more particularly, to systems for developing and processing control applications for building systems.

BACKGROUND OF THE INVENTION

Most commercial properties include a number of building systems that monitor and regulate various functions of the building for the comfort and well-being of the tenants. These building systems include security systems, fire control systems, and elevator systems. One prevalent and important building system is the environmental control system.

An environmental control system is used to regulate the temperature and flow of air throughout a building. The air conditioning for a building typically includes one or more chillers for cooling air and one or more heaters for warming air. Fans distribute air conditioned by a chiller or heater into a duct system that directs the flow of air to the various rooms of a building. Dampers are located within the duct system to variably control an opening to a branch of a duct system or to a room. The dampers are maneuvered through a range of movement from being 100% open to 0% open, i.e., closed, by actuators. Also, the speed of a motor that drives a fan is controlled to regulate fan speed and, correspondingly, air flow in the system. An important component of a building environmental system is the control system that varies the fan motor speed and the position of the various dampers to maintain pressure and flow rate set points for the system.

Control systems for building systems are increasingly reliant upon computer and network technology. Micro-controllers and the like may be used to operate and maintain actuators for damper position as well as controlling fan speed. These local controllers provide operational data to an overall system controller. The overall system controller is typically a computer that analyzes data received from local controllers to determine whether system parameters, such as set points, are being maintained. If the system parameters are not being met, the system controller issues command messages to one or more local controllers to adjust local control so the system parameters may be achieved. In some previously known systems, the system controller communicates with the local controllers over a computer network. Most typically, the hardware platform for the network is an Ethernet platform and the network software supporting communication over the network is a TCP/IP layer. This structure supports communication between a control application program executing on the system controller and an application program executing on the local controller. However, the computer network does not provide remote building system engineers with access to the application programs.

In order to monitor a building system, a system controller typically receives status data from local controllers periodically or as conditions change. These data may be analyzed by the system controller to determine whether commands for local controllers should be generated and then discarded or stored after being analyzed. These stored data may be characterized as historical data for the building system. These historical data may be very useful for determining response characteristics of a building system or for other system modeling uses. However, these historical data are typically stored at the building site. Consequently, these data are inaccessible to building system engineers unless a copy of these data are generated and migrated to another location for analysis and modeling purposes. Additionally, previously known systems require the system controller to store the operational data in a database. Thus, the system controller absorbs an administrative overhead for managing the storage of operational data in a local database. This administrative overhead ma include programming logic to convert data values to a common format or to manipulate the application programming interface (API) of a database.

In an effort to reduce this administrative overhead, systems have been developed that segregate the informational aspects of a building control system from the control aspects. For example, U.S. Pat. No. 6,141,595 discloses a system that includes an information layer and a control layer that interface with a group of databases. The control layer enables control applications to access attribute data for the purpose of operating control devices in a building. Optimization applications update the control attributes for improved control of the building system. The information layer supports communication with applications through the Internet or other network interfaces so external users may access the data in the databases. The control and optimization applications, on the other hand, query the databases through their respective APIs. Thus, control and optimization application developers need to be able to program the access methods for the various databases into their applications. The control layer provides a standardized interface for the control and optimization applications to the components of the building system.

While the system of the '595 patent separates external user communication with the databases from the control and optimization application communication with the databases, it still requires the control and optimization application developers to program database access methods in the applications. Consequently, the building engineers are required to be knowledgeable regarding a variety of database APIs. Furthermore, the control and optimization applications are not readily accessible to the external users. Also, the system of the '595 patent assumes that the control and optimization applications are tested and fully developed before being installed between the control layer and the system database APIs. However, the system of the '595 patent does not provide an environment for accessing data to model and to test an application before being installed on the system.

In addition to the data limitations of previously known systems, there are other issues that compound the problem of developing applications for building systems. Typically, companies that manage buildings have to somehow obtain the programs for controlling a building system from an outside source. Otherwise, the building manager would need to keep a team of system engineers and programmers for application development. The system engineers understand the building system components and develop control algorithms and load predictors for control of the system. However, they typically do not have adequate knowledge of software methodologies and programming techniques to generate and test computer programs efficiently. Likewise, the computer programmers and software engineers are able to design, develop, test, and integrate computer programs but they do not possess the building system expertise to appropriately apply control theory to building system components. Typically, however, companies that manage building systems do not have sufficient resources to support a team of system engineers and software engineers. Accordingly, they employ a staff of technicians to maintain and operate the building system components and seek to obtain the application solutions for their system needs from outside sources.

One way in which building management companies may seek to obtain application solutions is to purchase general purpose control programs for systems comprised of components similar to the ones in a particular building system. However, no such general purpose solution exists as the uniqueness of building system topology, component composition, and other factors make it impracticable to develop and adapt a general solution for most building system needs efficiently.

Another way to obtain application solutions is to procure the services of an building system engineering service. Typically, these companies employ both building system engineers and computer engineers for developing and testing application solutions for building systems that are owned and operated by one or more building management companies. The obstacles to the development and testing of application solutions for different building systems are significant. For one, building systems use different types of controllers, actuators, and networks for communicating between building system components. As a result, the computer engineers need to be able to write programs in a variety of control program languages and implement controls for and obtain data from a plethora of devices that require commands and supply data in different formats. Additionally, the computer engineers must be able to work with system engineers to convert the control algorithms and load predictors designed by the system engineers into computer software. This human interface may require an extensive amount of time and significant expenditure of resources to take a building system solution from its system design to implementation in a building system. This expenditure is especially exacerbated when, for example, system engineers who specialize in load prediction and system engineers who specialize in HVAC systems both need to have their designs implemented by the same computer engineering team for a building system. This need puts pressure on the computer engineering team to develop expertise for writing software in different operational fields without proven expertise in each of those fields.

One way that a computer engineering team meets these types of needs is to obtain various software packages from software vendors and then adapt them for implementing a piece of an application solution. For example, a neural network package may be purchased and adapted to implement a load forecasting component of a building system solution. Another package that may be required is a data base management system for storing and querying data required for application solution support. Other packages may include data computational programs for various building system parameters and other engineering tools for particular building systems. However, one problem with this approach is the need to integrate disparate packages that may be programmed in different languages operating on different platforms. Latency and data compatibility issues may arise during the integration efforts.

What is needed is a system for facilitating the development of application solutions with reduced compatibility issues.

What is needed is a system for developing application solutions that does not require implementation of solution components in a variety of computer languages.

What is needed is a system for reducing the need for human interaction in translating a system engineering design into an operational solution.

What is needed is a system that provides support for diverse fields of operational expertise.

What is needed is a system for developing control applications without requiring knowledge of a database API being programmed into the application.

What is needed is a system for developing control applications that permit the real-time and historical data for a building system to be used for application modeling and testing without requiring the installation of the application in the system.

What is needed is a way to enable external users to access applications.

SUMMARY OF THE INVENTION

At least some of the above limitations of previously known systems and methods may be overcome by a system and method implemented in accordance with one or more embodiments of the present invention. Some embodiments include a systems design verifier and a system design converter for converting a verified system design into an application solution. The systems design verifier is configured to receive a system design, preferably written in a language for describing a system and control logic for the system. The language is selected as being familiar to system engineers for identifying system components and requirements. For example, XML files may be used to identify HVAC components and the duct layout in a system. Verification of a system design includes checking the syntax of the system description and logic. The system design converter generates computer program statements for components in the building system to implement the system design.

Embodiments of the present invention may also include a tool interface for coupling to the system design converter so that the design converter may generate computer program statements for use of a computer tool. These computer tools include data organization tools, such as data base management systems, data filtering tools, statistical analysis packages, and analytical methods, such as linear programming modules. The design converter generates the computer programming statements for manipulating the interface to a computer tool to pass data to a tool for the generation and return of data. For example, the design converter may provide variable values for a set of equations and a forcing vector to a linear programming tool and receive a set of equation coefficients. The system may also include an interface for external computer program modules that may be included in the application solution. For example, a proportional-integral-derivation control loop module may be accessed through the external program interface.

The embodiments of the present invention that include the interfaces for computer tools and external programs enables the system design converter to convert a system design into computer program statements that may be executed by one or more components of a building system. The tools interface enables the design converter to obtain data for incorporation in the program being generated by the converter and the external program interface permits the design converter to include statements for using external programs in the program being generated. These interfaces also provide testing support for a generated program. Once tested, the generated program may be stored in a file for transmission or other transfer to a building site for installation in one or more components of the building system.

Some embodiments of the present invention enable system engineers to design building system control logic that is converted into a computer program without requiring the system engineers to communicate system design expertise to software engineers or to write computer programs. Likewise, the computer engineers are able to focus on selecting computer tools and external programs that may be used to support application solution development and then programming the interfaces to make the tools and external programs accessible to the programs generated by the converter. The system design converter, tools interface, and external program interface comprise an application infrastructure.

A first embodiment is a system that includes a database, a data provider interface for converting between a common database access method and a database application programming interface (API), and an application infrastructure for coupling an application program to the data provider interface so that an application having common database access method instructions may access the database through the data provider interface. The application infrastructure of the present invention provides an interface to the data provider that does not require the system engineer to provide database instructions that conform to the API for the database. Instead, the data provider converts the common database access method instructions of the system design program to access method instructions that conform to the API for the database. Likewise, the responses from the database received by the data provider through the database API are converted into responses compatible with the common database access method instructions so the application may receive the requested data. The infrastructure and data provider interface of this embodiment are especially advantageous when the database is comprised of a plurality of databases with each database having a different database API. This interface structure enables, for example, a historical database, or data mart, to have a different structure and interface that better supports data mining than a real-time database interface. For example, the data mart may use a star or snowflake data organization to facilitate data mining while the real-time database retains a more conventional Standard Query Language (SQL) interface. The application infrastructure allows the application programmer to develop an application without requiring knowledge of the two database structures and their particular APIs. Consequently, a building system control application developer may concentrate on those aspects of an application that provide efficient control over the building parameters affected by the application.

The application infrastructure of the present invention may also include Web-based components for coupling application solutions to the Internet or other computer networks that use the TCP/IP or other communication schema of the Internet. Again, the system engineer need not be proficient in the details of the implementation of the network access. Instead, the engineer defines the application as requiring Web-based communication and an appropriate Web-based interface component is provided so the application and/or its output may be accessed over the Internet or other computer network. Preferably, the application infrastructure also includes Windows-based components for communicating with other applications that run under a version of the Windows operating system. Again, the engineer need not be proficient in the application-to-application communication techniques under the Windows system as the Windows-based components provide that communication interface through a more generic interface through which the applications may be coupled.

The above-described architecture of the present invention enables system engineers to develop application programs without requiring the engineers to know the subtleties and nuances of specific database APIs and communication protocols. Instead, the engineers may focus on the engineering requirements of the building system being controlled by the application and the effects of the control actions of the application. This segregation of the communication and database access components into the application infrastructure and data provider interface empower building system engineers to generate application solutions more efficiently. Furthermore, the Web-based components may be used to make the applications available to users through a customer web portal (CWP). The CWP enables the applications to be developed by a service organization at a common site where the database is maintained so the applications may be developed and tested with a wide variety of data. The applications once tested and verified as being field ready, may be downloaded through the CWP to a particular building site and installed as an application for execution by a system controller or local controller in the building system. Also, the CWP may be used by external users to access reports or other summaries that may be generated by applications operating on the data mart. This Web access enables data mining applications and the historical database to be maintained at a common site rather than requiring every building site to have its own database and data mining applications.

An embodiment of the system of the present invention may also include a configuration data utility for developing a system design program representative of a building system and associating configuration data with the components identified in the file structure generated by the configuration utility. Preferably, the configuration data utility uses Extended Markup Language (XML) to organize the components of a building system in a file/folder structure. The utility also associates configuration data, such as that related to devices and sensors, with component folders in the XML structure. This utility enables an application program to traverse the file/folder structure to obtain and to process data for building system components.

An embodiment of the system of the present invention may also include a data collector interface for coupling external data sources to the database. The data collector interface converts data from the native format for an external data source to one that is compatible with the structure of the database in which the data is stored. This data conversion function of the data collector interface enables the database or databases of the present invention to be coupled to a plurality of external data sources without requiring that all of the external data sources conform to one particular database structure. Furthermore, the data collector interface includes transaction services that generate the instructions for a database API that are required to store the data in the database. Thus, data sources from diverse locations may be coupled to a database at a common site. Consequently, a significant accumulation of historical data may be obtained for a data mart component of the database, which further enhances the value of the data mining applications at the common site. However, the data provider interface also supports the segregation of the collected data into different databases so control application programs may be developed from the data originated at the particular building site for which the application is being developed.

Other embodiments of the system of the present invention may also include a scheduling service that may be coupled to the application programs and the data collector interface. In accordance with schedule data, the scheduling service activates data collector interface components to interrogate external data sources for data that may then be converted for storage in the database or data mart component maintained at the common site. In this manner, the database and data mart are automatically updated. In a similar manner, the scheduling service activates application programs for operating on the data stored in the database and/or data mart component to generate reports that may be accessed through the CWP or Windows-based communication methods. Thus, the system of the present invention not only facilitates the development of application programs for building systems but it enables remote users to obtain timely analysis of the data from a building system without the need to maintain application programs or a database at a building site.

An exemplary embodiment of an inventive method includes verifying an application definition to identify data for implementing in the application defined by the application definition and converting the identified data into computer program statements. The computer data conversion includes program statements using computer tools and external programs. The definition verification includes verifying the syntax of the application definition.

The application data conversion may include converting common database access method instructions into database API queries, and converting the responses to the database API queries into common database access method responses. The application data conversion for data base access enables application programs to have a common interface to a database or databases without requiring the system engineer to provide database instructions that conform to the API for the database. Instead, the data provider of a tool interface converts the common database instructions of an application definition to an access method that conforms to the API for the database. Likewise, the responses from the database through the database API are converted into the common database instructions so the application may receive requested data. The conversion of this embodiment is especially advantageous when the database is comprised of a plurality of databases with each database having a different database API. The conversion allows a system engineer to develop an application without requiring knowledge of the two database structures and their particular access interfaces. Consequently, a building system control application developer may concentrate on those aspects of the application that provide efficient control over the building parameters affected by the application.

The data identification may be comprised of obtaining a list of point types that are used as inputs for the application and mapping each point type to an actual control system point name. Preferably, the control system point names are contained in a configuration data file compiled by a configuration data utility. The actual control system point names are used to generate the API queries for retrieving data from a database for the application. The application definition may be verified to identify common calculation components that may be used to generate outputs for the application. The outputs of the application may be delivered to external users through the CWP or stored in the database through the data provider.

The delivery through CWP may also include identifying Web-based components that are coupled to an application communication over the Internet or other computer network. Again, an application developer need not be proficient in the details of the implementation of the network access. Instead, Web-based components transparently communicate data over the Internet or other computer network. Delivery to another Windows application, preferably, includes identifying Windows-based components that are coupled to an application for communication between applications running under a version of the Windows operating system. Again, the application programmer need not be proficient in the application-to-application communication techniques under the Windows system as the Windows-based components provide that communication interface through a more generic interface through which the applications may be coupled.

The output of an application may include an application or a group of set points that may be delivered to an external application through the CWP. The CWP enables the applications to be developed by a service organization at a common site where the database is maintained so the applications may be developed and tested with a wide variety of data. The applications once tested and verified as being field ready, may be downloaded through the CWP to a particular building site and installed as an application executed by a system controller or local controller in the building system. Also, the CWP may be used by external users to access reports or other summaries that may be generated by applications operating on the data mart. This Web access enables data mining applications and the historical database to be maintained at a common site rather than requiring every building site to have its own database and data mining applications.

The configuration data files may be developed as structures with file and folder names that correspond to building system components having associated data that identify the contexts of the components. Preferably, the file and folder structures are developed using Extended Markup Language (XML) to organize the components of a building system. The context data includes manufacturer data, engineering units, location data, and other building system data. These data enable an application program to traverse a configuration data file to obtain data for building system components so building system control applications may be tested.

Embodiments of the method of the present invention may also include determining an activity is scheduled for execution and activating the activity. The activity may include obtaining data from an external data source and converting the data so the data are compatible with a database in which the data are stored. This source data conversion enables the database or databases of the present invention to be coupled to a plurality of external data sources without requiring that all of the external data sources conform to one particular database structure or representative schema. Furthermore, the data conversion enables data sources from different building sites to be coupled to a database at a common site. Consequently, a significant accumulation of historical data may be obtained for the data mart, which further enhances the value of the data mining applications at the common site. However, the source data conversion also supports the segregation of the collected data into different databases so control application programs may be developed from the data originated at the particular building site for which the application is being developed.

Activities that may be activated by scheduling include application programs for operating on data stored in a database and/or data mart to generate reports that may be accessed through the CWP or Windows-based communication methods. As previously noted, the scheduling may also include activating interrogation of external data sources for data so the data may be converted for storage in the database or data mart maintained at the common site. In this manner, the database and data mart are automatically updated. Thus, the method of the present invention not only facilitates the development of application programs for building systems but it enables remote users to obtain timely analysis of the data from a building system without the need to maintain application programs or a database at the building system site.

The system and method of at least some embodiments of the present invention facilitates development of application solutions with reduced compatibility issues.

The system and method of at least some embodiments of the present invention do not require implementation of solution components in a variety of computer languages.

The system and method of at least some embodiments of the present invention reduce the need for human interaction in translating a system engineering design into an operational solution.

The system and method of at least some embodiments of the present invention provide support for diverse fields of operational expertise.

The system and method of at least some embodiments of the present invention enable the development of control applications without requiring knowledge of a database API being programmed into the application.

The system and method of at least some embodiments of the present invention permit real-time and historical data for a building system to be used for application development without requiring the installation of the application in a particular building system controller.

The system and method of at least some embodiments of the present invention provides a mechanism that enables external users to access applications.

The system and method of at least some embodiments of the present invention provide database access for application programs that does not require database API programming.

These and other advantages and features of at least some embodiments of the present invention may be discerned from reviewing the accompanying drawings and the detailed description of the invention.

BRIEF DESCRIPTION OF THE DRAWINGS

The present invention may take form in various components and arrangement of components and in various methods. The drawings are only for purposes of illustrating exemplary embodiments and alternatives and are not to be construed as limiting the invention.

DETAILED DESCRIPTION OF THE INVENTION

Figure 1A:
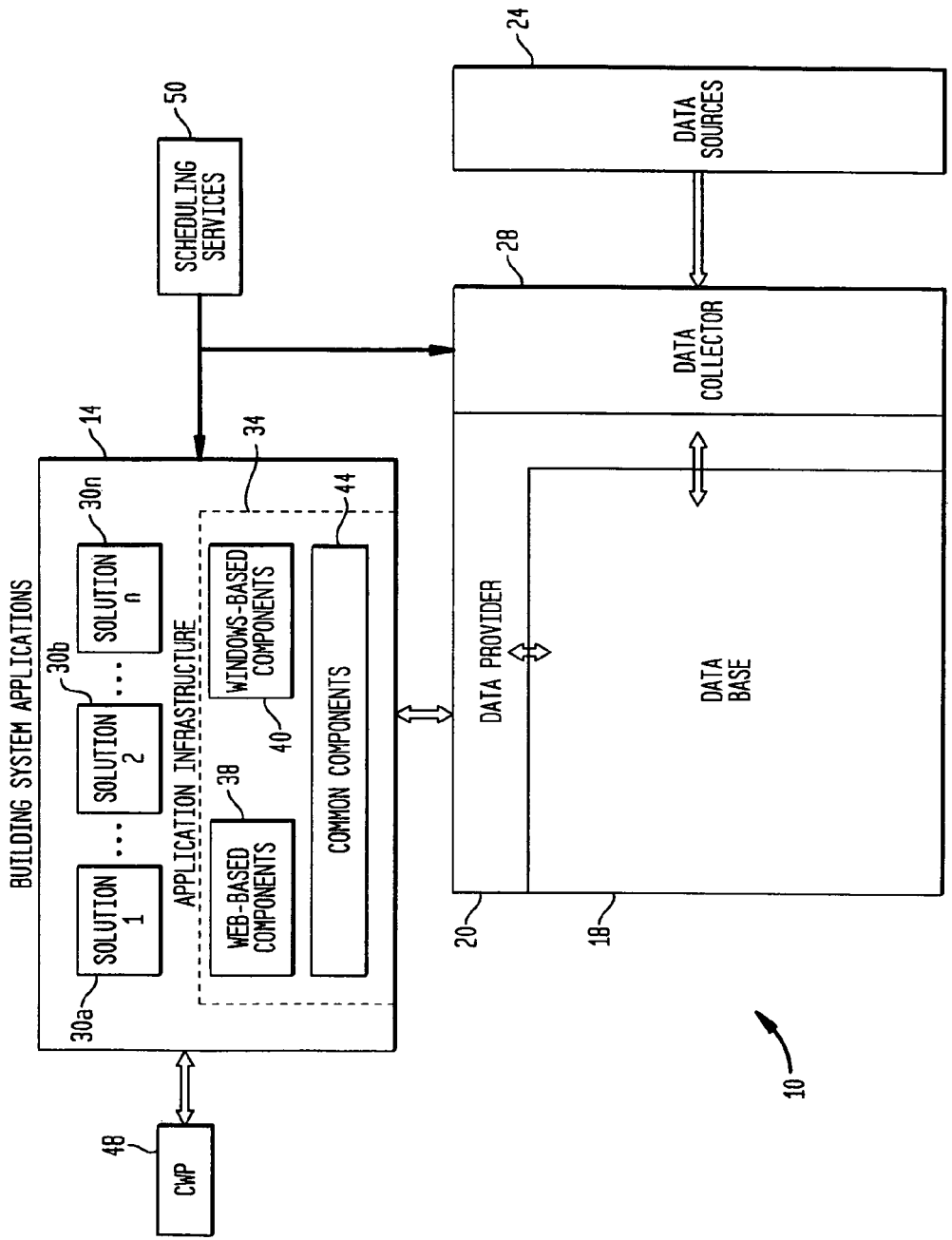
FIG. 1A is a block diagram of a system made in accordance with the principles of the present invention.

A system 10 incorporating the principles of the present invention is shown in FIG. 1. System 10 includes building system applications 14 that are coupled to database 18 through data provider 20. External data sources 24 are coupled to database 20 through data collector 28. Application programs 30a-30n that implement solutions for a building system are coupled to application infrastructure 34. Application infrastructure 34 includes common components 44 for coupling application programs 30a-30n to data provider 20 as well as to web-based components 38 and Windows-based components 40. Web-based components 38 may be used by an application program 30a-30n to communicate with a remote application over a TCP/IP computer network such as the Internet. Preferably, TCP/IP computer network communication is performed through customer web portal (CWP) 48. Likewise, Windows-based components 40 may be used by an application program 30a-30n to communicate with a remote application through a Windows operating system. Although components 40 are described as being Windows-based, components 40 may also include components for communicating with other applications through a Unix, Mac OS, Linux, or other operating system. System 10 may also include scheduling services 50 for activating application programs 30a-30n or data collector 28 to perform their tasks in accordance with scheduling data.

Application solutions 14 execute on a computer having sufficient resources to support the applications as well as web-based components 38 and Windows-based components 40. For example, a computer system having at least a Pentium 4 processor operating at 1.8 GHz with 128 MB of RAM and a 60 GB hard drive is required for application space execution. The operating system of the computer may be used to provide security for applications 14. For example, the Windows operating system may be used to check user names, verify passwords, provide encryption, and control other access paths for activating applications. This security is available for those users who connect to the operating system of the computer and attempt to log on the computer. Applications 14 may also participate in system security by verifying user authorization to execute an application, by not storing unencrypted passwords, and by using secure procedures for accessing database 18. Likewise, file and folder permissions may be set to restrict user access to specific folders and files for application activation and data.

Web-based components 38 may communicate with users external to the site where the applications are executing. For these users, CWP 48 also requires security/authentication functions. Preferably, this security is supported by a lightweight directory access protocol (LDAP) database and a single sign-on may be used to allow access to applications that may be activated by users over the Internet. Single sign-on may be used to permit users to switch between applications without having to logoff and log on again.

Figure 1B:
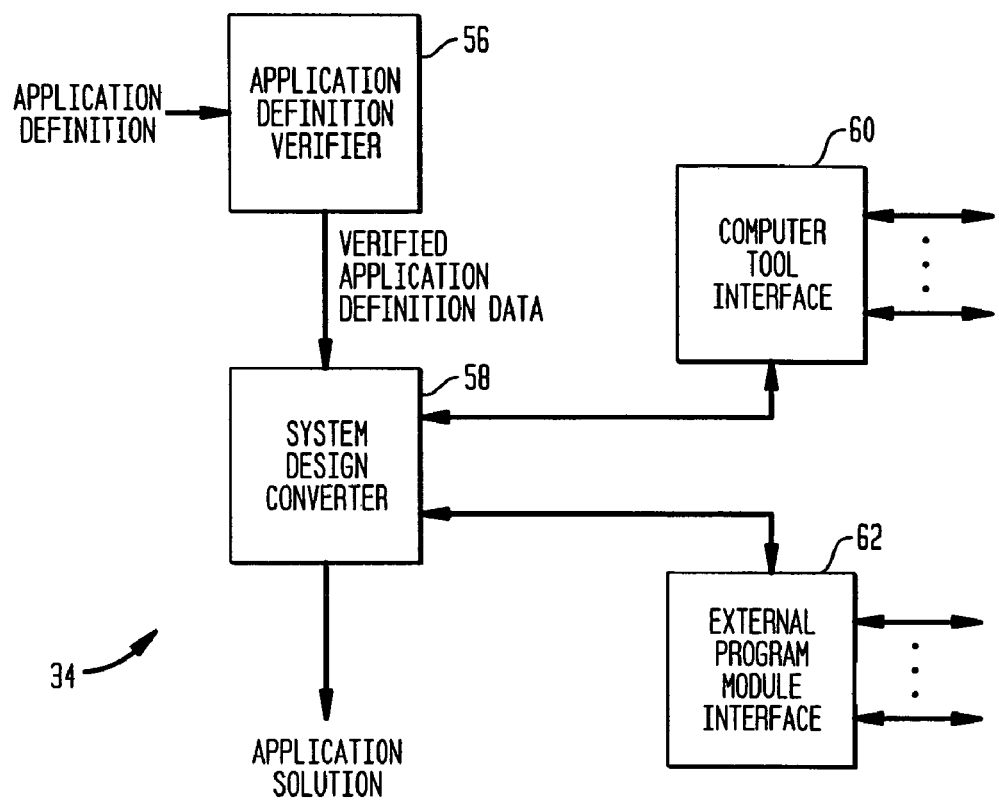
FIG. 1B is a block diagram of the infrastructure shown in FIG. 1A.

Infrastructure 34 is shown in more detail in FIG. 1B. Infrastructure 34 includes an application definition verifier 56, a system design converter 58, a computer tool interface 60, and an external program interface 62. Application definition verifier 56 parses and verifies the syntax of an application definition as discussed in more detail below. Preferably, an application definition is written in a language or graphical interface that may be used to describe components in a system as well as the control logic or algorithm for a building system. For example, the topology of a HVAC system and the configuration data for the components of the system may be described with an XML schema as described below. These data may be converted by system design converter 58 into computer statements for implementing the control logic of the application definition. Converter 58 is preferably written in a high level language that is common for engineering applications such as MATLAB, which is available from Mathworks, or MATHEMATICA, which is available from Wolfram. This program generates computer statements for the controllers that will execute the application program in a building system. If data are required for the generation of computer statements to implement an application solution then design converter 58 uses tool interface 60 or external program module interface 62 to obtain data or external program modules for inclusion in the computer statements being generated by converter 58.

Interfaces 60 and 62 are common interfaces that convert statements from converter 58 that are in a common tool interface format or a common external program interface format. Interfaces 60 and 62 may be interactive for querying a user of converter 58 for data that may be used to activate a tool or external program. For example, a set of modeling equations described in the application definition may use historical data in a data base that may be accessed through computer tool interface 60. The modeled responses may be obtained from a linear programming external module coupled to converter 58 through interface 62. Examples of computer tools that may be accessed through computer tool interface 60 include data organization tools, such as data base management systems, data filtering tools, statistical analysis packages, and analytical methods, such as linear programming models. programs that may be accessed through external program module interface 62 may include, for example, proportional-integral-derivative control loop modules and other modular computer program components. The components coupled to the system design converter may be a web-based component 38, a Windows-based component 40, or a common component 44. Thus, infrastructure 34 enables a system engineer to define an algorithm and system structure that may be converted into an application solution for a building system. System design converter 58 uses data derived from computer tools that are accessed through computer tools interface 60 and incorporates external program modules that are obtained through external program interface 62. Consequently, the system engineer is not required to be able to program in the control language of the building system components nor does the engineer need to know how to manipulate the computer tools or to select the external program modules. Instead, the components of infrastructure 34 perform these tasks for the engineer automatically.

Figure 2A:
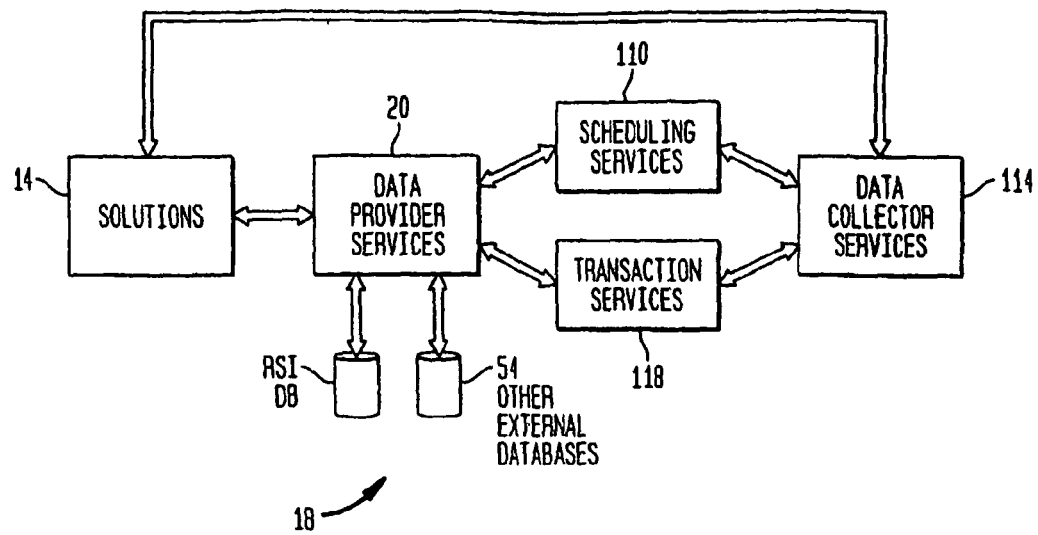
FIG. 2A is a block diagram of the components of the system shown in FIG. 1 that build and maintain the data in the database of FIG. 1.

As shown in FIG. 2A, applications 14 are coupled to database 18 through data provider services 20. Database 18 may be comprised of one or more databases. Separate databases may be used to segregate data for different sites from one another or because different data formats are better suited for various types of data. For example, a historical database or data mart 54, as it may be called, may be stored in a database with a star or snowflake configuration. This data structure facilitates data mining and the like for generating summary reports and analysis of the data within the data mart. A real-time database 52 may be maintained within database 18 for the storage of operational data from a building system coupled to database 18 through data collector services 114 as discussed in more detail below.

Database 18 may be comprised of more than one database and each database may be managed by its own database management system (DBMS). Each DBMS communicates with data provider 20, which is part of interface 60, to provide data to application 30*a*-30*n*. Data provider 20 may execute on a computer having a Pentium 4 processor operating at 1.8 GHz with 128 MB of RAM and 60 GB of hard drive storage. A DBMS for any of the database(s) of database 18 may be any known DBMS. Data provider services 20 act as a software wrapper for database 18 and provide common business logic for the applications accessing database 18. Data provider 20 receives database instructions from applications 30*a*-30*n* that conform to a common database access method instruction format and converts them into database queries that conform to the API for the particular database within database 18 that the application is attempting to access. The API responses to the queries are received by data provider services 20, converted to the common database language form, and returned to applications 14. Thus, data provider services handle the API specifics for communicating with a database within database 18. This permits the application programmer to view all of the databases as having a homogeneous structure that may be accessed by the same access methods.

Figure 2B:
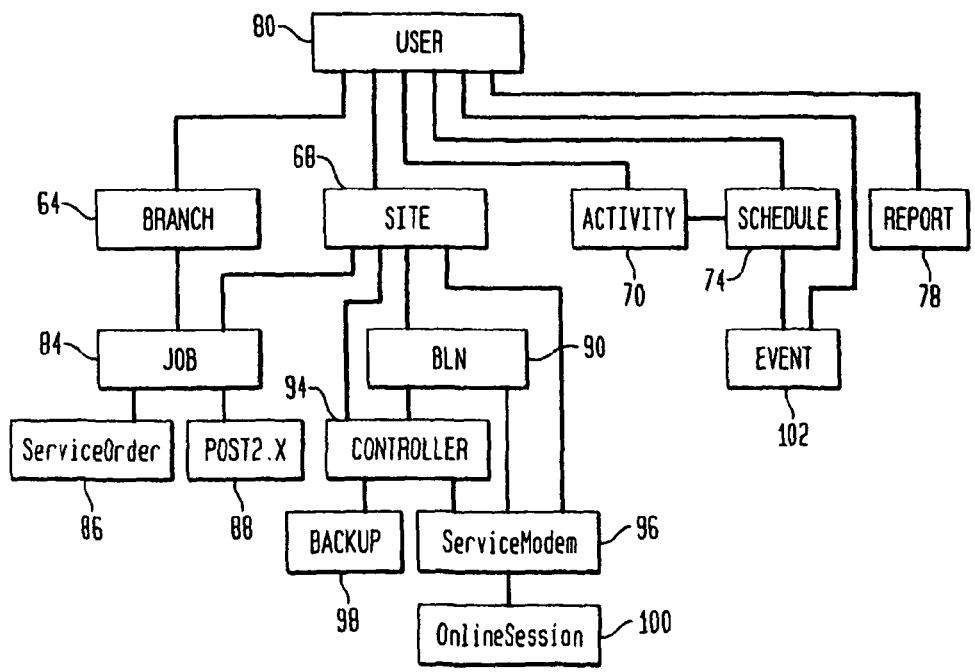
FIG. 2B is a diagram depicting an exemplary business logic structure that may be supported by a data provider of the present invention.

A business logic model that may be supported by data provider 20 is shown in FIG. 2B. The model associates a branch 64, a site 68, an activity 70, a schedule 74, and a report 78 with a user 80. User 80 includes identification for an application 30*a*-30*n* within system 10. User identification may be comprised of a logon account, domain name, and other related data. Preferably, the operating system of the computer on which data provider 20 executes may also perform application management and authentication. For example, data provider 20 may execute on a computer under control of a Windows NT 4.0 operating system so authentication of applications for access to database 18 is performed in accordance with the operational parameters of that operating system. Once authenticated, an application may access branches that are associated with the application, sites for the branch jobs associated with the authorized branches, activities associated with the sites, the schedules for performing the activities, and the reports related to the sites associated with the authorized branches for the user. Of course, this model is merely exemplary and other models may be used.

In the model shown in FIG. 2B, the parent nodes may contain references to the children nodes so that navigation to a child occurs through a parent. Each child may also contain a reference to its parent so navigation may proceed upwardly as well. Associations with a parent cause deletion of a parent node to result in the deletion of its associated children nodes. For example, deletion of a controller causes all backups associated with the controller to be deleted as well. A job is a command procedure performed in the context of a branch. A job 84 may be defined by a service order 86 or a command procedure in a particular command language 88, such as Post 2.x. Associated with a site 68 is a building level network(s) (BLN) 90. The controllers 94 and service modems 96 for a BLN 90 may be identified in the exemplary structure shown in FIG. 2B. Data for a service modem may be used to specify the information required for establishing communication with a modem. As described below, a data collector service may be activated to establish communication with a service modem so configuration data may be retrieved through the modem. The configuration data may be used to generate the controller node for a service modem during initialization of an application's portion of database 18. Generation of a service modem 96 so it may be contacted to retrieve configuration data for its parent controller is sometimes referenced herein as "discovery." Discovery may also be used after initialization to update configuration data for an associated node. By scheduling discovery for all service modems 96 associated with a particular user, system 10 may obtain up-to-date data for components within a branch. Preferably, backups 98 are stored with timestamps. Service modems 96 may also be used to troubleshoot a controller and the online session data 100 may be captured and stored in the model.

Activity 70 and schedule 74 data may be used to activate an activity at a particular time. Preferably, activity 70 includes backing up one or more field panels, restoring one or more field panels, generating a report, activating an application, or invoking discovery to obtain data for a particular BLN. This preferred list of activities is merely exemplary and other activities may be identified and stored within the model shown in FIG. 2B. Schedule data 74 identifies the activities to be activated, a time for occurrence of an activity, and the frequency of an activity, if the activity is a recurring activity. Event data 102 identifies the status of an activity. For example, it may identify a transient state, such as "active" while an activity is occurring, or a success/failure status for a performed activity. Additionally, event data 102 may identify changes within an application's data, such as deletion of a node along with the time and application identification data. Thus, event data may be used to ensure the integrity of database 18 and to provide an audit trail for database changes. To further protect data within an application's data space, some nodes may be read only. For example, user, branch, and job data may be read only data to reduce the likelihood that they are inadvertently changed. Report data 78 may be used to identify a report name, the application generating the report, a timestamp for the report, a list of activities that reference the report, as well as the content of a report.

Figure 3:
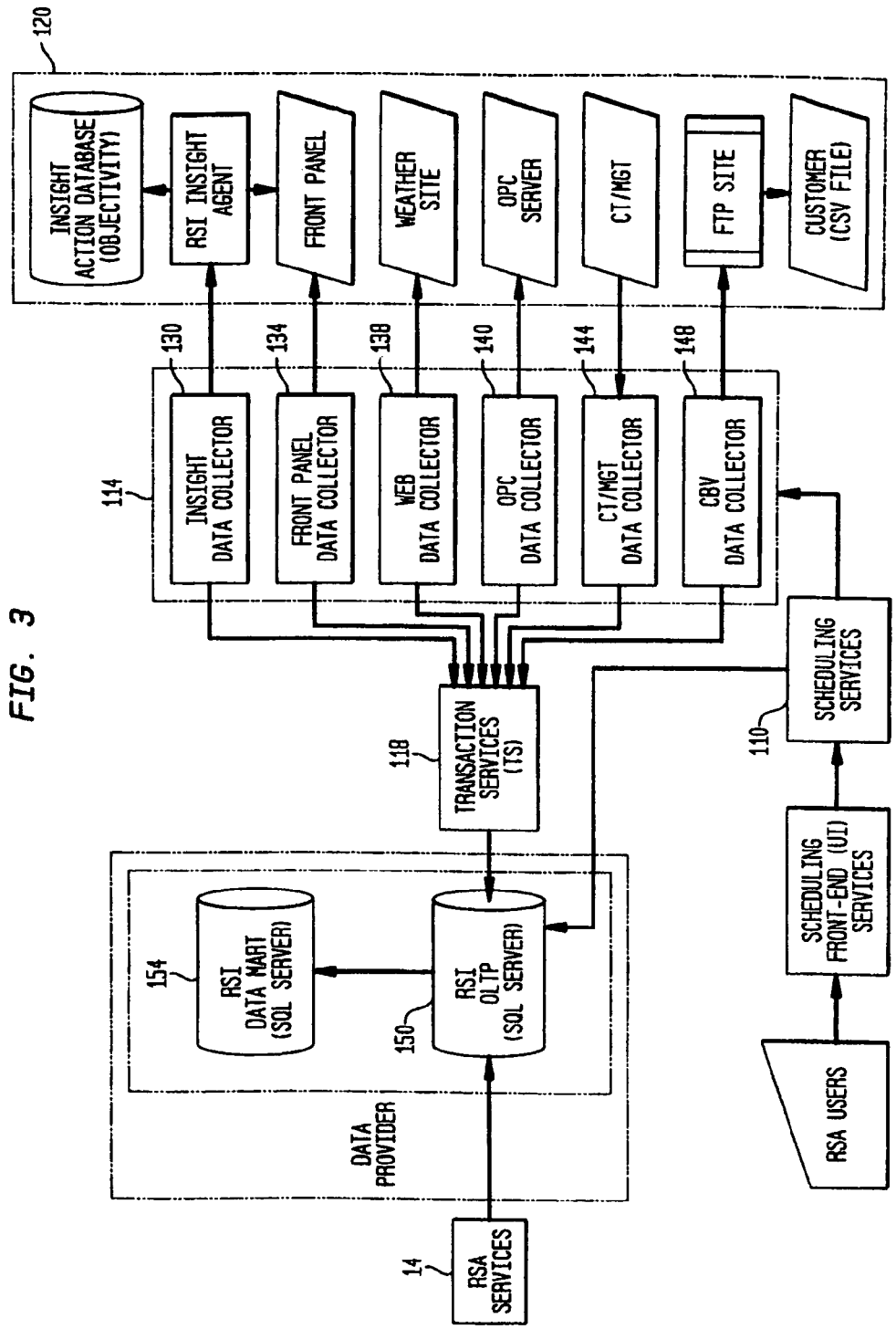
FIG. 3 is a block diagram depicting the external data sources that may be used to build and maintain the database shown in FIG. 2A.

Database 18 may also include a data mart component. A data mart is comprised of pre-constructed data for interactive use with an application 30a-30n for report and analysis purposes. These data are typically obtained from cleansing, refining, transforming, calculating, and deriving new measures from raw data stored in database 18. The segregation of data for report and analysis purposes from the real-time components of database 18 reduces the risk of performance problems arising from transaction service interaction with the real-time components of database 18. The data mart component may be constructed according to a star or snowflake configuration as this data model is more conducive to report generation or data mining applications. Preferably, data from a data collector service 114 is provided by a transaction service 118 to a SQL Server 200 Replication Service 150 which may be part of the implementation of database 18 (FIG. 3). A Data Transformation Service (DTS) that may be included as part of database 18 may be activated by Replication Service 150 to convert the received data into the appropriate format for data mart server 154. Alternatively, the DTS may be activated by scheduling service 110 in response to detection of a particular event.

With reference to FIG. 2A, scheduling services 110 execute existing schedules, detect database changes and update schedules in response to detected changes, respond to schedules as they reach their activation time, coordinate with data collector services 118, and update events in accordance with the status of a schedule. Database changes that may require schedule updating are, for example, a controller backup for a controller that is deleted from a BLN. Coordination with data collector services 118 includes rescheduling an activity that cannot be performed. For example, if no modem is available for data collector services 118 to use to communicate with a service modem, scheduling services 110 generates a data entry for performing the activity at another time. Event data generation may be distributed between scheduling services 110 and an activity. For example, scheduling services 110 may update an event to identify the time for a BLN backup but the backup activity generates the timestamps for individual controller backups and the timestamp for the end of the BLN backup event. Preferably, scheduling services 110 may activate activities as one-time occurrences or as recurring on an hourly, daily, weekly, monthly, or yearly basis. Monthly recurrence may be scheduled as a particular date and time of day each month or as a particular day of the week and time of day each month. Scheduling services 110 may be implemented with a MFC (Microsoft Foundation Class) library or by using NET technology if the implementation uses a web based platform. The MFC library and NET technology are both available from Microsoft Corporation of Redmond, Wash.

Transaction services 118 receive data in a common data format from data collector services 114 and provide the data to data provider 20 for populating the data structures of database 18. Each transaction service of transaction services 118 uses the common database instructions for communicating data with data provider 20, which provides the data through the API of the appropriate database component of database 18 in which the data is to be stored.

Data collector services 114, FIG. 2A, include activities that may be activated by scheduling services 110 for the purpose of providing data from an external data source 120 in a common data format to a transaction service 118 (FIG. 3). Preferably, the native format data of external data sources 120 are converted to an XML schema, although common data representation schema may be used. Transaction service 118 reads the collected data and uses it to populate the data structures of database 18. Also, an application solution(s) 30a-30n may activate a data collector service 114 to obtain data from an external data source 120 (FIG. 3). Any application 30a-30n activating a data collector service 114 to obtain data, preferably, contains logic for communicating with the activated data collector service interface and the data are delivered to the application solution and not to transaction service 118 for storage in database 18. Data collector services 114 initiate connections with external data sources through communication devices, such as modems, for example. As discussed above, scheduling services 110 or an application solution 30a-30n may be required to reschedule a request for a connection in response to no communication device being available for data collector services 114 to connect with an external data source. In response to an external data source replying that a communication device is not available, data collector services 114 may reschedule a connection attempt. For example, a busy signal from an external data source may cause a data collector service to redial the external data source modem for some number of tries before sending a message to a scheduling service or application that indicates the connection attempt failed. Data collector services 114 manage the communication devices during a data exchange with an external data source and generate the status data for events to be stored in database 18. Event data may include time of connection establishment, duration of a connection, termination of a connection, and number of connection attempts, as well as other data related to communication with external data sources.

As shown in FIG. 3, data collector services 114 may include, for example, a building control system database collector 130, a field panel data collector 134, a web data collector 138, an OPC (open connectivity) data collector 140, commissioning/mechanical design data collector 144, and a customer service order data collector 148. Building control system database collector 130 communicates with a building control system to download update data for a local database so it may be stored in database 18. Field panel data collector 134 communicates with a field panel in a building control system to obtain data for updating data stored in database 18 associated with a particular field panel. Web data collector 138 communicates with external data sources on the World Wide Web of the Internet to obtain data for storage in database 18. For example, this data collector may obtain weather data, utility rates, equipment trend data, and the like for storage in database 18 so an application 30a-30n may forecast load requirements for a building control system. OPC data collector 140 uses data objects from open standards to obtain data for storage in database 18. Commissioning/mechanical design data collector 144 communicates with devices associated with a building control system that contain data regarding the commissioning of equipment in a building system or the mechanical design of the system. For example, duct dimensions and geometry are mechanical design data that may be obtained by data collector 144 for storage in database 18. Customer service orders and their status data may be obtained from a customer service server by data collector 148. Preferably, these data are obtained using the File Transfer Protocol (FTP), although other communication protocols and methods may be used for the transfer of customer service data.

Figure 4:
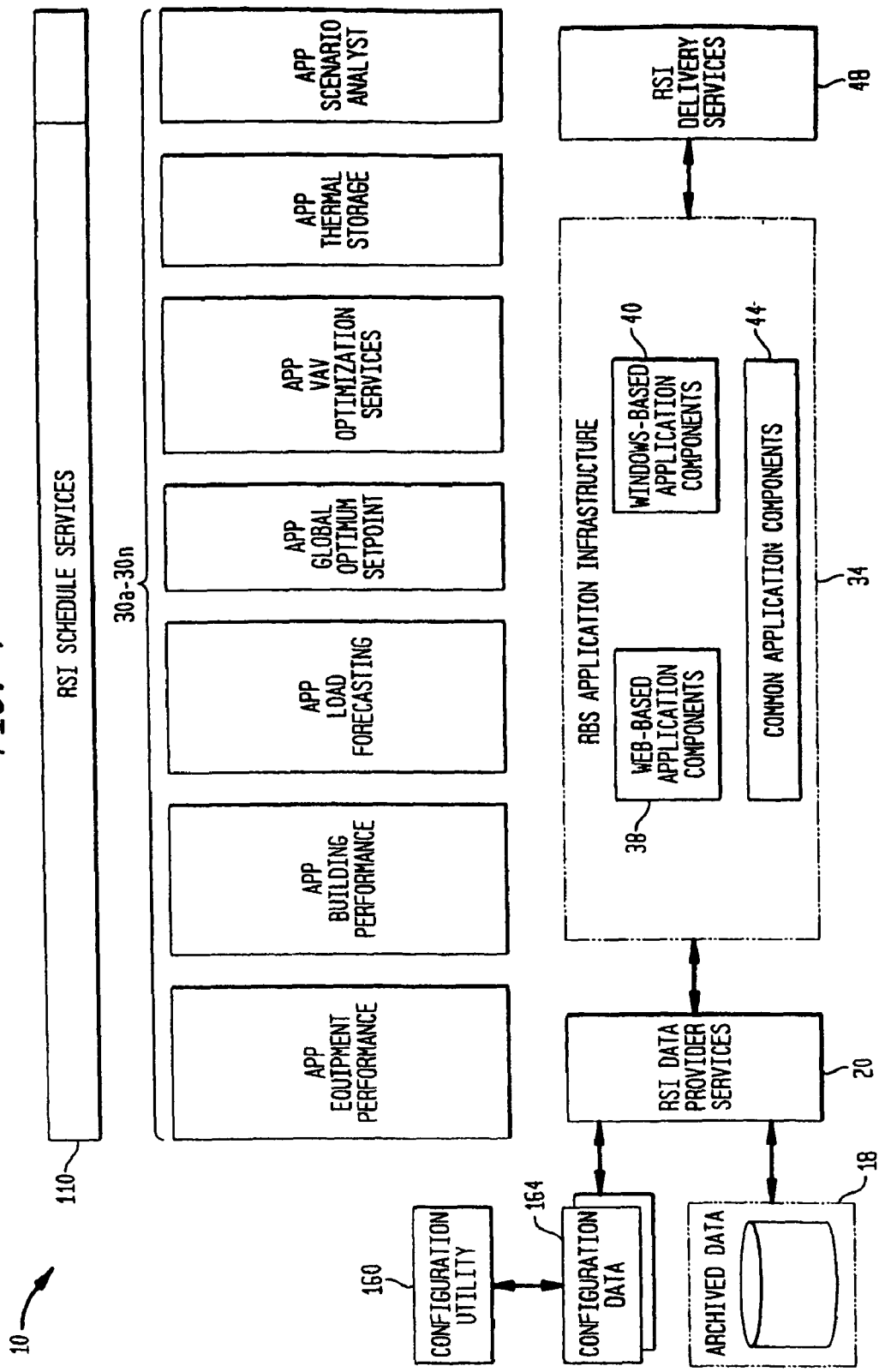
FIG. 4 is a block diagram of the relationships between applications developed with the system of the present invention and the components of the system.

Using like numerals for like components, system 10 may be depicted as shown in FIG. 4. System 10 includes applications 30a-30n, scheduling services 110, application infrastructure 34, CWP 48, data provider 20, and database 18 as discussed above. System 10 also includes a configuration utility 160 that generates a configuration data file 164. Configuration utility 160 may be used by an application 30a-30n or by an external user accessing utility 160 locally or through CWP 48 to submit configuration data that are formatted into a configuration data file 164. Configuration data include plant configuration data, equipment nameplate data, sensor point identifiers, status point identifiers, command point identifiers, equipment arrangement data, and equipment relationships. Configuration data also include system context data such as whether a sensor is at an inlet or an outlet, the material being monitored such as water, glycol, refrigerant, gas, air, or the like, and the physical units for measuring an element, such as degrees Fahrenheit, psi, or the like. Equipment typically identified for building HVAC systems are chillers, pumps, secondary chilled pumps, cooling towers, air-handling units, analog sensors, analog control points, digital sensors, and digital control points. Analog sensors typically include temperature, pressure, and flow sensors as well as kW power and kWh energy meters. Analog output points provide set point data to controllers that may be presented in floating point format. Digital sensors are typically on/off indicators, dirty filter indicators, and the like. Digital output points are typically on/off command points.

Preferably, configuration data file 164 is implemented in XML. XML is supported by a wide variety of software vendors and users may define the tags in XML that describe data content. In the present invention, generic tag names, such as site, building, plant, cooling plant, and heating plant, may be used to represent location and group contexts. Generic names, such as circuit, bank, branch, inlet, outlet, supply, discharge, return, actual, and setpoint, may be used to represent system configurations and functions. Equipment type identifiers, such as condenser, compressor, chiller, evaporator, pump, and fan, may be used to represent equipment contexts. Identifiers, such as temperature, pressure, relative humidity, flow, and air change, may be used to represent sensor types. Generic element names, such as air, water, glycol, refrigerant, power, and energy, may be used to identify media in a system. Generic attributes, such as volume and capacity, may be used to identify nameplate data and design information. As noted above, parent-child relationships in the database may be used to identify equipment group relationships.

Figure 5:
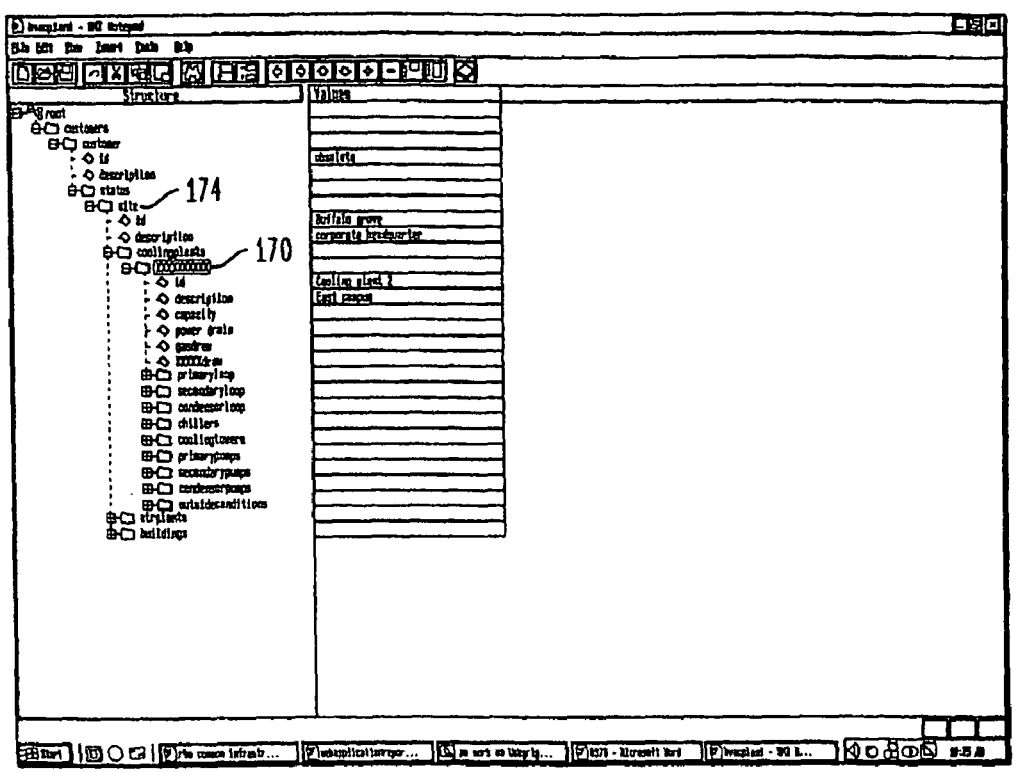
FIG. 5 depicts an exemplary XML structure that identifies a building system.

A screen of a representative system depicting the exemplary XML implementation of a configuration data file is shown in FIG. 5. As shown in the figure, structure of a file is shown on the left portion of the screen while the right side describes the data. For example, one of the cooling plants 170 is identified and described by the data associated within the file schema as "Cooling plant 2, East campus." Likewise, site 174 of the building system is identified and described by its associated data as "Buffalo grove, Corporate headquarters."

Figure 6:
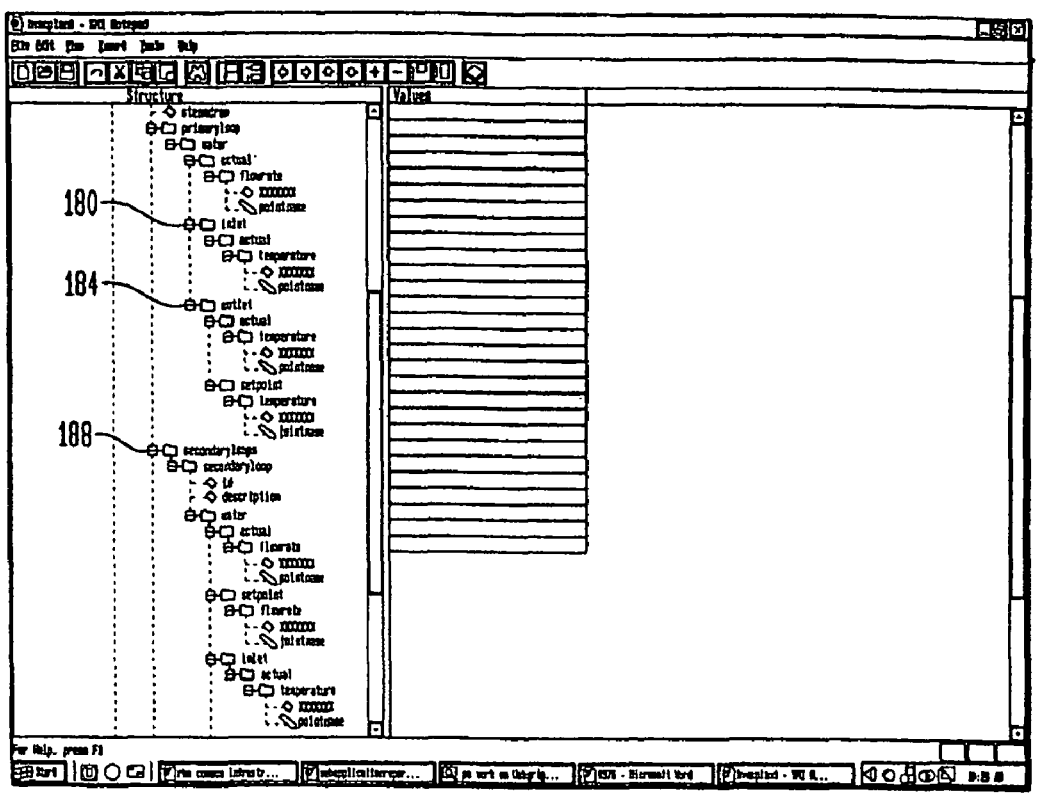
FIG. 6 depicts an exemplary XML structure that identifies loops within the building system of FIG. 5.
Figure 7:
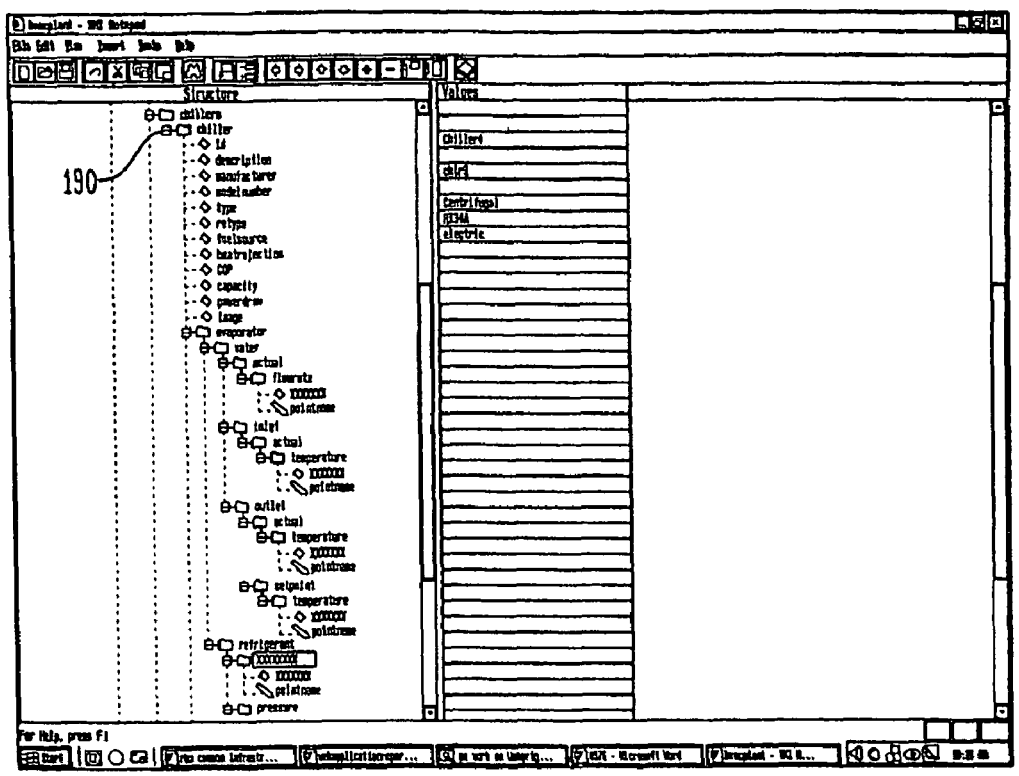
FIG. 7 depicts components within the loops of FIG. 6.

FIG. 6 depicts a primary loop that was shown as a folder in FIG. 5. In FIG. 6, the folder is opened to reveal it is a water loop and the data value fields for the name of the point and their measured engineering units may be entered by an application or other user with configuration utility 160. Inlet 180 and outlet 184, as well as secondary loop 188 and its components, are identified in a similar manner. Likewise, the chiller folder of FIG. 5 is opened in FIG. 7 to reveal specific equipment data and name for chiller 190. Although the data shown in FIGS. 5-7 may be represented in a relational database, the flexibility and expansion of the XML representation makes it the preferred implementation structure for the configuration data.

Common components 44 (FIGS. 1 and 4) provide a library of software components that may be used to execute an application 30a-30n, to use configuration data files, to retrieve data from database 18 through data provider 20, to prepare data for an application, and to execute another application. These components also operate on application definitions to identify input data needed for execution of the application, to map the identified input data to data within a configuration file, to map required points with identified system points, to retrieve data from database 18, to perform standard engineering calculations for equipment components, and to provide data to other applications. Preferably, applications and reports are developed by defining a process with application instructions that invoke common components. Other common components may include components for obtaining data from external data sources such as weather data or utility rates. When an application is invoked, the application process definition is parsed and the components executed using data retrieved from a configuration data file 164 or database 18. If the application uses web-based components, an Active Server Page (ASP) component is preferably invoked for parsing and executing the application definition. For applications invoked by local users, a Windows component is preferably invoked for parsing and executing the application definition.

Figure 8:
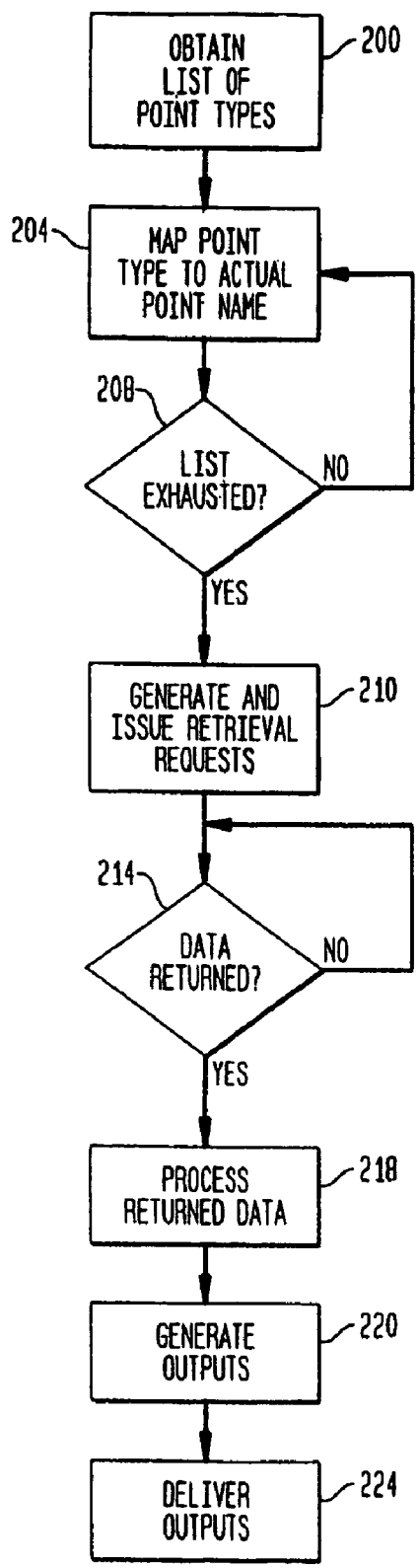
FIG. 8 is a block diagram depicting an exemplary method incorporating the principles of the present invention.

An exemplary method for processing application definitions is shown in FIG. 8. An application definition is parsed to obtain a list of point types used as inputs for the application (block 200). Each point type is mapped to an actual control system point name defined in a configuration file (block 204). The mapping process is repeated until all point types and devices have been processed (block 208). Calls to data provider 20 are generated and issued (block 210) to retrieve the data required for application processing. Upon return of the requested data (block 214), the application processes the data (block 218) and generates outputs (block 220), such as reports or set point calculations, for example. The outputs may be delivered to a user (block 224) by either posting them for retrieval at CWP 48 or by storing the outputs in database 18 for later retrieval.

The structure of wrapping database 18 in a data provider 20 relieves a building system application programmer from having to program logic for database access. Likewise, manipulation of configuration data files, database access, web communication, or operating system communication, may be performed by common components within application infrastructure 34. This enables an application programmer to program logic for building system control and engineering without having to learn and provide logic for database API interaction or computer network communication. Likewise, database 18 may be updated and maintained by activities associated with building system structure that may be activated on a scheduled basis. Again, data provider 20 converts native mode data into a common format for storage in database 18 so data collector services do not have to contain database API logic. Thus, the architecture of system 10 supports the development of application solutions in an environment that does not require database and computer communication programming knowledge and that supports delivery of the applications or their outputs to external users over the Internet.

While the present invention has been illustrated by the description of exemplary processes and system components, and while the various processes and components have been described in considerable detail, applicants do not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicants' general inventive concept.

What is claimed is:

1. A non-transitory computer readable medium encoded with program instructions for automatically generating building system application solutions by:
    verifying an application definition with a system design verifier configured to receive markup language files corresponding to the application definition that identify HVAC components for a building system;
    delivering the verified application definition from the system design verifier to a system design converter;
    converting the verified application definition from the system design verifier into a building system application solution installable in a controller of the HVAC components of the building system with the system design converter, the building system application solution including computer statements, wherein the computer statements are executable on a processor of the controller to implement the building system application solution that corresponds to the application definition;
    providing data from computer tools to the system design converter via a computer tool interface for incorporation within the computer statements; and
    utilizing an external program module interface coupled to the system design converter to provide modular computer program components to the system design converter for incorporation within the computer statements that are executable on the processor to implement the building system application solution;
    wherein the computer tool interface and the external program module interface convert statements from the system design converter that are in a common tool interface format, or a common external program interface format.

2. The computer readable medium of claim 1 wherein the system design verifier is configured to receive XML files that identify the HVAC components and a duct layout for the building system; and the system design converter is configured to convert a verified XML file into engineering application language statements that are executable on the processor to implement the building system application solution that corresponds to the XML file.

3. The computer readable medium of claim 2 wherein the system design converter is configured to generate engineering application language statements in the MATLAB language.

4. The computer readable medium of claim 2 wherein the system design converter is configured to generate engineering application language statements in the MATHMATICA language.

5. The computer readable medium of claim 1 wherein the computer tool interface couples at least one of a data organization tool, a data filtering tool, a statistical analysis tool, and an analytical tool to the system design converter.

6. The computer readable medium of claim 5 wherein the data organization tool is a data base management system.

7. The computer readable medium of claim 5 wherein the analytical method tool is a linear programming module.

8. The computer readable medium of claim 5 for automatically generating building system application solutions by further converting between a common database access method and a database application programming interface with a data provider interface coupled to the system design converter through the computer tool interface; and wherein the data organization tool is configured to employ a common database access method to access a database coupled to the data provider.

9. The computer readable medium of claim 8 wherein the external program module interface is configured to provide a proportional-integral-derivative loop control module to the system design converter.

10. A method for automatically generating building system application solutions comprising:
    verifying an application definition with a system design verifier configured to receive markup language files corresponding to the application definition that identify HVAC components for a building system;
    converting the verified application definition into computer statements with a system design converter, wherein the computer statements are for implementing a building system application solution that corresponds to the application definition;
    providing modular computer program components to the system design converter for incorporation within the computer statements that implement the building system application solution;
    providing data from computer tools to the system design converter via a computer tool interface for incorporation within the computer statements; and
    utilizing an external program module interface coupled to the system design converter to provide modular computer program components to the system design converter for incorporation within the computer statements that are executable on a processor to implement the building system application solution;
    wherein the computer tool interface and the external program module interface convert statements from the system design converter that are in a common tool interface format and a common external program interface format;

installing the computer statements in a controller of the HVAC components of the building system; and executing the computer statements with the controller.

11. The method of claim 10 further comprising: receiving a XML file that identifies HVAC components and a duct layout for a building system; and converting the verified XML file into engineering application language statements to implement the building system application solution that corresponds to the XML file.

12. The method of claim 11, the conversion further comprising: generating engineering application language statements in the MATLAB language.

13. The method of claim 11, the conversion further comprising: generating engineering application language statements in the MATHMATICA language.

14. The method of claim 10 further comprising: providing data from computer tools for incorporation within the computer statements that implement the building system application solution that corresponds to the application definition.

15. The method of claim 14 further comprising: coupling at least one of a data organization tool, a data filtering tool, a statistical analysis tool, and an analytical tool to provide data for incorporation within the computer statements implementing the building system application solution.

16. The method of claim 15 wherein the data organization tool coupling couples a data base management system for incorporation of data from a database within the computer statements implementing the building system application solution.

17. The method of claim 15 wherein the analytical method tool coupling couples a linear programming module for incorporation of data from the linear programming module within the computer statements implementing the building system application solution.

18. The method of claim 15 further comprising: converting between a common database access method and a database application programming interface to access a database.

19. The method of claim 10 wherein the modular computer program component provision includes providing a proportional-integral-derivative loop control module for incorporation within the computer statements implementing the building system application solution.

20. A computer implemented with an architecture for automatically generating building system application solutions comprising:

a system design verifier configured to verify an application definition, the system design verifier configured to receive XML files corresponding to the application definition that identify HVAC components and a duct layout for a building system;

a system design converter coupled to the system design verifier, the system design converter configured to convert verified application definitions into a building system application solution installable in a controller of the HVAC components of the building system, the building system application solution including computer statements that are executable on a processor incorporated into the controller to implement the building system application solution that corresponds to the application definition;

a computer tool interface coupled to the system design converter, the computer tool interface configured to provide data from computer tools to the system design converter for incorporation within the computer statements executable on the processor; and an external program module interface coupled to the system design converter to provide modular computer program components to the system design converter for incorporation within the computer statements that are executable on the processor to implement the building system application solution;

wherein the computer tool interface and the external program module interface convert statements from the system design converter that are in a common tool interface format and a common external program interface format.

* * * * *